(12) United States Patent
Kim

(10) Patent No.: US 7,813,728 B2
(45) Date of Patent: Oct. 12, 2010

(54) METHOD OF AUDITING ALARMS IN A CDMA-2000 SYSTEM

(76) Inventor: Heung Ryong Kim, Hyundai 5-cha Apt. 504-602, Sadong-ri, Daewol-myeon, Icheon-si, Gyeonggi-do 467-736 (KR)

( * ) Notice: Subject to any disclaimer, the term of this patent is extended or adjusted under 35 U.S.C. 154(b) by 696 days.

(21) Appl. No.: 10/555,825

(22) PCT Filed: May 28, 2004

(86) PCT No.: PCT/KR2004/001272

§ 371 (c)(1),
(2), (4) Date: Sep. 5, 2006

(87) PCT Pub. No.: WO2004/107615

PCT Pub. Date: Dec. 9, 2004

(65) Prior Publication Data

US 2007/0041354 A1 Feb. 22, 2007

(30) Foreign Application Priority Data

May 29, 2003 (KR) .................. 10-2003-0034431

(51) Int. Cl.
*H04B 17/00* (2006.01)
*H04W 24/00* (2009.01)
(52) U.S. Cl. .................. 455/423; 370/242; 370/248
(58) Field of Classification Search ........... 370/342, 370/249, 338; 455/70, 67.4
See application file for complete search history.

(56) References Cited

U.S. PATENT DOCUMENTS 5,086,506 A * 2/1992 Hall et al. ............ 455/8

(Continued)

FOREIGN PATENT DOCUMENTS

KR  1019990040844  6/1999

(Continued)

OTHER PUBLICATIONS

Machine Translation of KR 2001026529 Publication Date Apr. 6, 2001.*

(Continued)

*Primary Examiner*—Rafael Pérez-Gutiérrez
*Assistant Examiner*—Frank Donado
(74) *Attorney, Agent, or Firm*—McDonnell Boehnen Hulbert & Berghoff LLP

(57) ABSTRACT

The present invention relates to a method for auditing alarms between a base station manager (BSM) and subsystems in a CDMA-2000 1x system that allows a reduction in the total amount of signals by having both systems exchange their own information instead of having lower systems report to upper systems one-way as in a conventional system. In particular, the method continuously forces the alarms that do not coincide between a BSM and subsystems to coincide by means of a 2-way communication method, where a BSM and each subsystem exchange their own information. The method makes the alarm state coincident between a BSM and each subsystem and keeps the load on the communication line between a BSM and a control station to a minimum. The operator can ascertain the real state of the present system with only a BSM, and take prompt action. Thus, the method contributes to improvement in call quality.

19 Claims, 5 Drawing Sheets

U.S. PATENT DOCUMENTS

| | | | |
|---|---|---|---|
| 5,666,356 A | 9/1997 | Fleming et al. | |
| 5,668,991 A | 9/1997 | Dunn et al. | |
| 5,737,319 A * | 4/1998 | Croslin et al. | 370/255 |
| 5,859,838 A * | 1/1999 | Soliman | 370/249 |
| 6,212,376 B1 * | 4/2001 | Hong et al. | 455/423 |
| 6,420,968 B1 * | 7/2002 | Hirsch | 340/506 |
| 6,604,137 B2 * | 8/2003 | Cowan et al. | 709/224 |
| 6,704,548 B2 * | 3/2004 | Jeong | 455/67.7 |
| 7,076,257 B2 * | 7/2006 | Kall | 455/456.1 |
| 2001/0046855 A1 * | 11/2001 | Kil | 455/421 |
| 2003/0147369 A1 * | 8/2003 | Singh et al. | 370/338 |
| 2003/0169851 A1 * | 9/2003 | Hirsch | 379/33 |
| 2004/0083407 A1 * | 4/2004 | Song et al. | 714/27 |
| 2004/0203686 A1 * | 10/2004 | Bahr | 455/418 |
| 2008/0043686 A1 * | 2/2008 | Sperti et al. | 370/338 |

FOREIGN PATENT DOCUMENTS

| | | |
|---|---|---|
| KR | 1020010026529 | 4/2001 |

OTHER PUBLICATIONS

International Search Report for PCT Pat. App. No. PCT/KR2004/001272.

International Preliminary Report on Patentability for PCT Pat. App. No. PCT/KR2004/001272.

* cited by examiner

METHOD OF AUDITING ALARMS IN A CDMA-2000 SYSTEM

TECHNICAL FIELD

The present invention relates to a method for auditing alarms between a base station manager (BSM) and subsystems in a CDMA-2000 1x system, which allows signal traffic to be reduced by having both systems exchange their own information, instead of having lower systems report to upper systems one-way as in a conventional system. In particular, the method continuously forces the alarms that do not coincide between a BSM and subsystems to coincide by means of a 2-way communication method, where a BSM and each subsystem exchange their own information, thereby making the alarm state coincident between a BSM and each subsystem and keeping the load on the communication line between a BSM and a control station to a minimum.

BACKGROUND ART

In general, a BSM in a CDMA-2000 1x system manages alarms of each subsystem in real-time and reports them to operators. The operators take prompt actions according to the reports, thereby keeping the call quality of subscribers high.

Each subsystem in a conventional system periodically sends Keep Alive Signals to the corresponding targets that the subsystem manages, receives responses from the corresponding targets to manage the state of the corresponding targets. Further, each subsystem in a conventional system compares a present state with a past state, and reports to a BSM in the form of a one-time event to notify the BSM if there are any changes.

However, sometimes the alarms do not coincide between the BSM and target boards maintained by the subsystems. To overcome this, conventional systems use an alarm audit function.

DISCLOSURE OF THE INVENTION

In a conventional system, significant loads put on the paths between a BSM and subsystems due to the periodic alarm audits, thereby lowering total system performance.

If communication with the corresponding subsystem is cut off for a while because of temporary communication trouble, hardware problems, etc., for that period the BSM cannot reflect the alarms for target boards maintained by each subsystem as they are. Thus, the BSM may miss an opportunity to take prompt actions.

Also, if event signals are lost due to temporary communication trouble, the alarms may not be coincident between the BSM and target boards maintained by the subsystems.

In these cases, it is not easy for the BSM in a conventional system to detect non-coincident alarms between two systems and to perform alarm to make the alarms coincident. Further, if the BSM fails to detect this phenomenon, the BSM cannot take action before other alarm changes of alarms occur for the corresponding target board. Thus, the alarms may remain non-coincident between the BSM and target boards maintained by the subsystems.

"Audit" means to watch and inspect the operating sequence of the data process system to examine whether data is processed in good order, safely and accurately, or whether a system functions effectively, in a computer system.

The object of the present invention is to provide a method of auditing alarms in a CDMA-2000 1x system that makes the alarm state coincident between a BSM and each subsystem and keeps the load on the communication line between a BSM and a control station to a minimum by continuously forcing the alarms that do not coincide between a BSM and subsystems to coincide by means of a 2-way communication method where a BSM and each subsystem exchange their own information each other. According to the present invention, the operator can ascertain the real state of the present system with only a BSM, and take prompt action. Thus, the method contributes to improvement in quality of call.

To attain the object, the present invention suggests the following method of auditing alarms in a CDMA-2000 1x system:

The method according to the present invention comprises the steps of:

transmitting an audit request signal periodically to a subsystem from a BSM, wherein the BSM manages target boards of the subsystem and the audit request signal includes alarm information of the target boards of the subsystem that are maintained by the BSM;

receiving the audit request signal from the BSM at the subsystem;

comparing an alarm for each target board maintained by the subsystem with the received alarm information; and transmitting an alarm report signal to the BSM from the subsystem, wherein the alarm report signal includes information on non-coincident alarms.

Also, to attain the object, the method of transmitting an audit request signal at a BSM according to the present invention comprises the steps of:

selecting a subsystem after registering a timer;

determining whether any subsystem is to be selected;

terminating the step of transmitting an audit request signal if no subsystem is to be selected;

selecting alarm codes for each target board of the subsystem if a subsystem is selected;

determining whether any alarm code is to be selected;

transmitting the alarm audit request signal to the corresponding subsystem and then returning to the step of selecting a subsystem, if no alarm code is to be selected;

reading the corresponding alarm code from an alarm database of the BSM if an alarm code is selected; and setting the alarm as a predetermined bit map, and then transmitting the alarm set as a predetermined bitmap to each subsystem.

Also, to attain the object, the method of transmitting an alarm report signal at a subsystem according to the present invention comprises the steps of:

checking whether the alarm audit request signal is received from the BSM;

checking if the audit request signal has been received;

selecting an alarm for a target board if the audit request signal has been received;

determining whether any alarm of the target board is to be selected;

terminating the step of transmitting an alarm report signal if an alarm is selected;

reading alarm information maintained by the BSM from a bit map if no alarm is selected;

comparing states of the BSM and the subsystem for the selected alarm;

returning to the step of selecting an alarm if both states are coincident; and transmitting on/off information of the selected alarm to the BSM.

According to the present invention, alarms can be kept coincident between the BSM and target boards maintained by the subsystem. Therefore, an operator can ascertain the real state of the present system with only a BSM and take prompt action. As a result, the method contributes to improvement in call quality.

BEST MODE FOR CARRYING OUT THE INVENTION

The preferred embodiment of the present invention according to the above-mentioned technical features of the present invention is described below, together with drawings.

Figure 1:
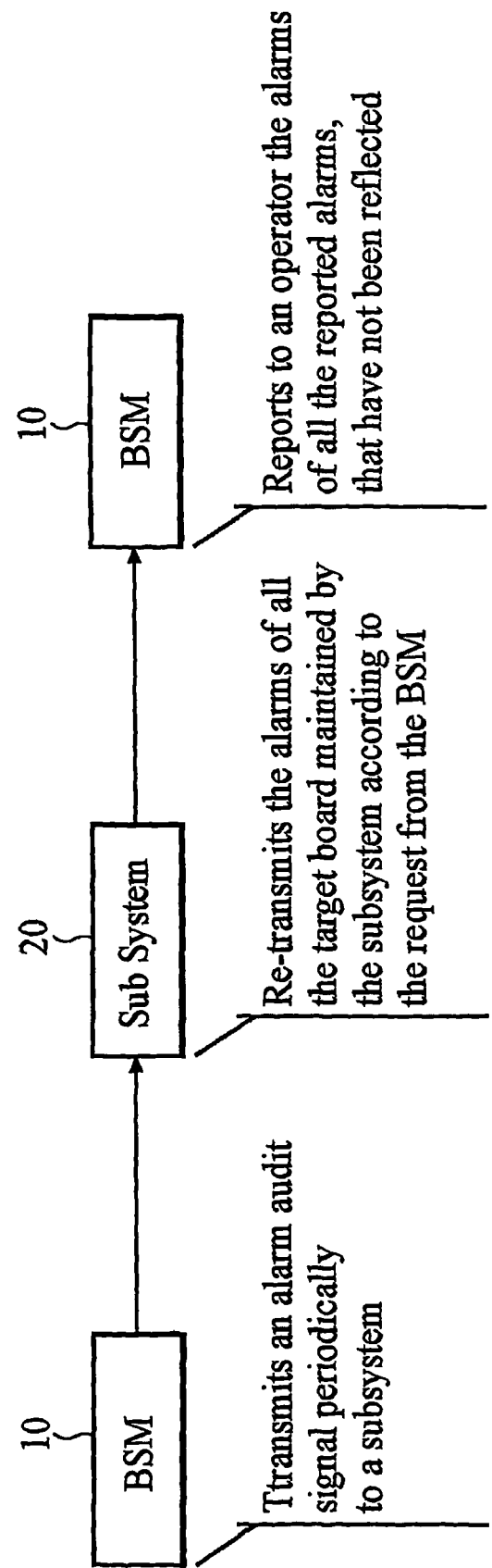
FIG. 1 shows a conventional method for auditing alarms.
Figure 2:
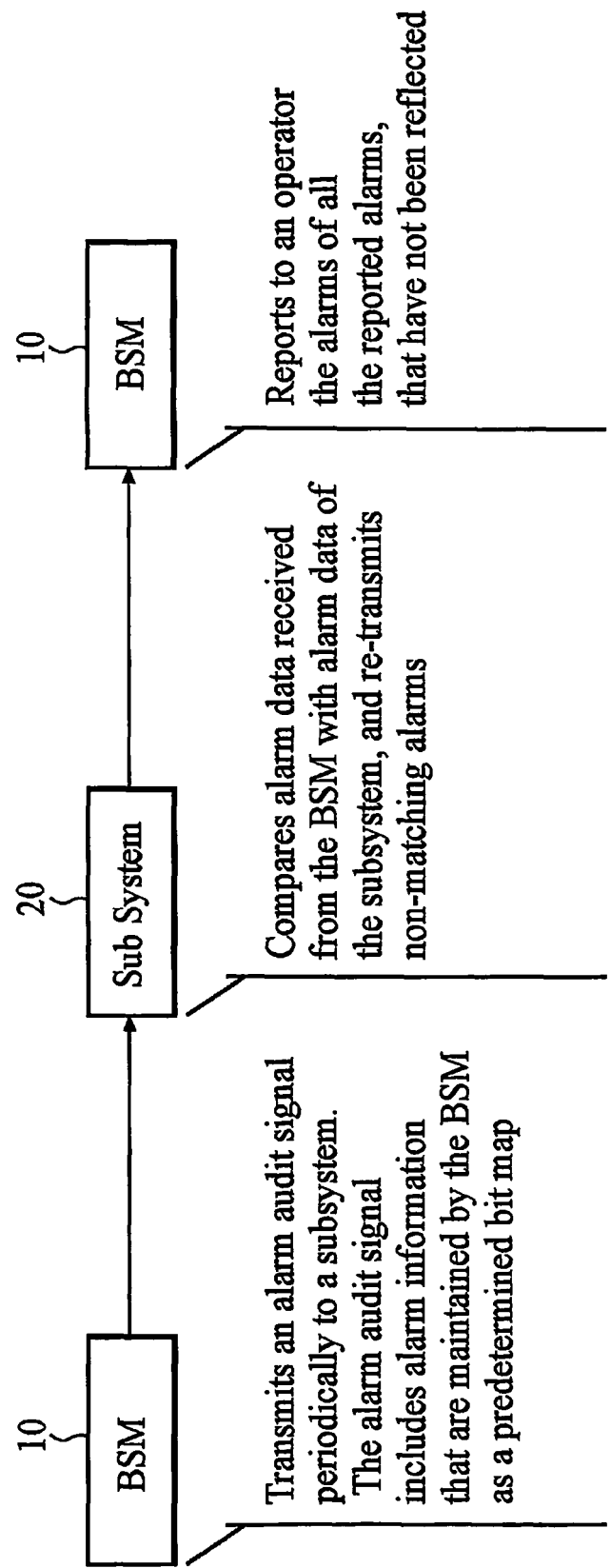
FIG. 2 shows a method for auditing alarms according to the present invention.

FIGS. 1 and 2 show a conventional method for auditing alarms and a method of auditing alarms according to the present invention, respectively.

As shown in FIG. 1, in a conventional system, BSM 10 periodically transmits alarm audit signal to a subsystem 20, and then subsystem 20 transmits signals for alarms of all target boards maintained by subsystem 20 to BSM 10. If any alarm is not reflected in BSM 10, BSM 10 reports it to the operator.

Next, as shown in FIG. 2, in a system according to the present invention, BSM 100 periodically transmits an alarm audit signal to subsystem 200, wherein the alarm audit signal includes a bit map indicating the alarm information maintained by the BSM. Then, subsystem 200 compares the alarm information in the received bit map with the alarms of its own, and transmits only the alarms that do not coincide with BSM 100. BSM 100 reports to the operator only the alarms that are not reflected in BSM 100 from the alarms received from subsystem 200.

A conventional alarm audit process and that according to the present invention are compared as follows:

In the conventional method, a BSM periodically transmits an alarm audit signal to a subsystem. Then the subsystem transmits signals for alarms of all the target boards maintained by the subsystem to the BSM.

According to the conventional method, significant loads are periodically put on the communication paths between the BSM and the subsystems due to the number of signals transmitted by the subsystem to the BSM.

That is, a conventional subsystem cannot have alarm information maintained by the BSM. Thus, the subsystem has to transmit alarms of all the target boards.

On the contrary, in the present invention, the alarm audit signal includes the alarm information maintained by the BSM. The subsystem transmits only the alarms that do not match. Thus, the quantity of signals between the two systems can be reduced.

Figure 3:
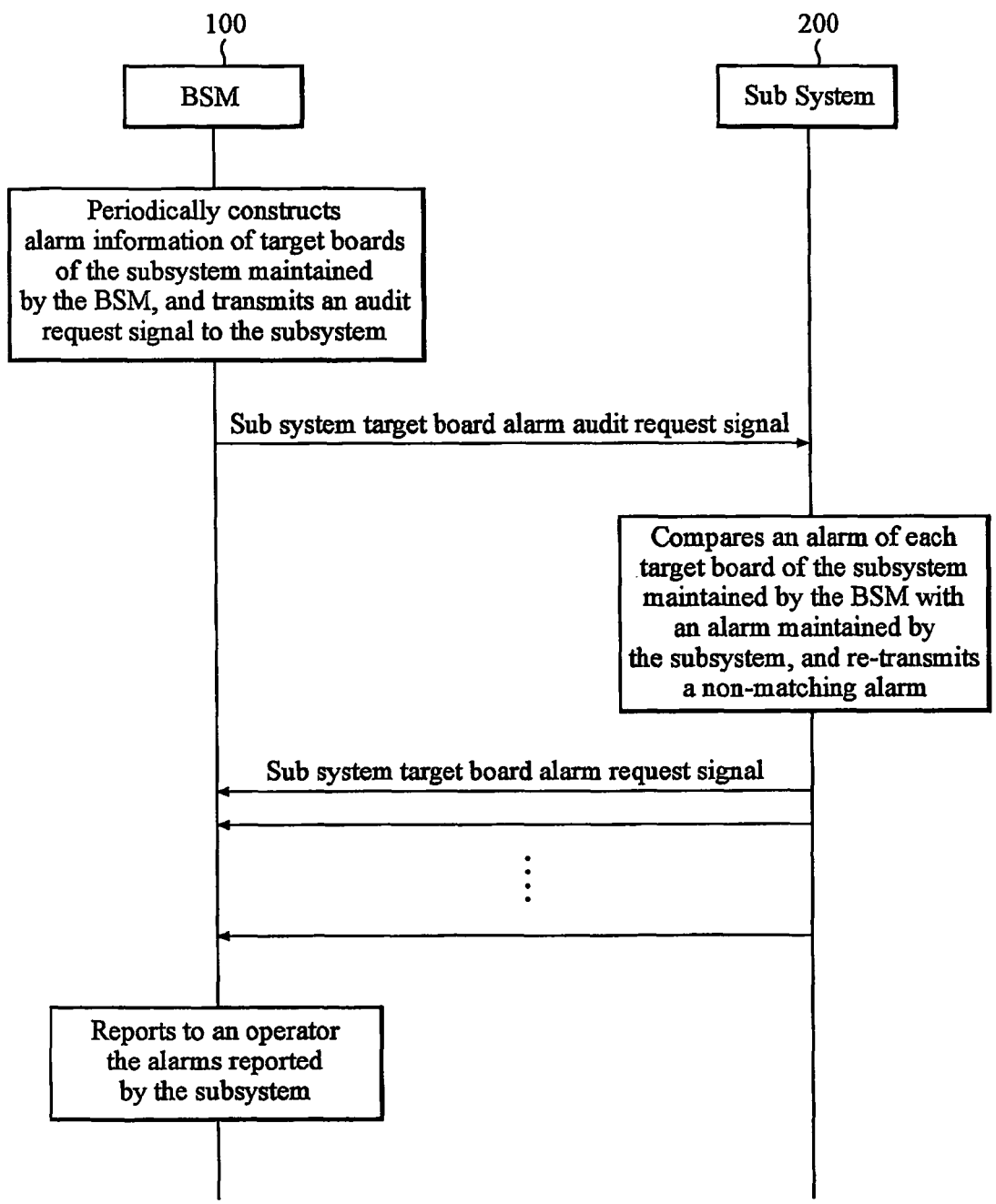
FIG. 3 shows the signal flow of the method for auditing alarms between a BSM and subsystems according to the present invention.

More detailed descriptions of the present invention are as follows:

FIG. 3 shows the signal flow in the method for auditing alarms between a BSM and subsystems according to the present invention.

As shown in FIG. 3, a method of auditing alarms in a CDMA-2000 1x system according to the present invention comprises the steps of periodically transmitting an audit request signal including alarm information maintained by BSM from the BSM to a subsystem, receiving the audit request signal from the BSM at the subsystem and comparing an alarm for each target board maintained by the subsystem with the received alarm information, and transmitting only alarms that do not match, and reporting the transmitted alarms to the operator at BSM.

Figure 4:
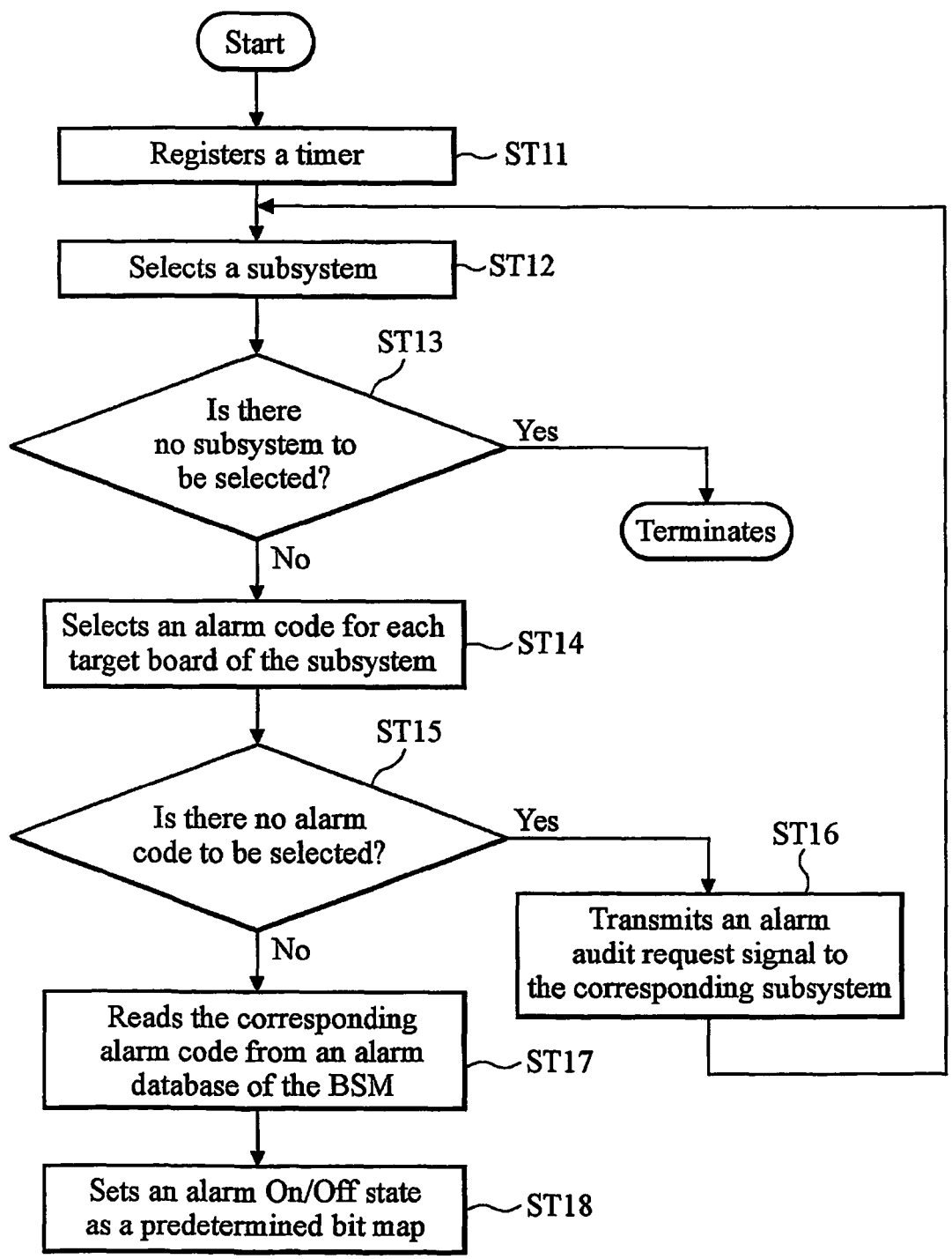
FIG. 4 shows the process for transmitting an audit request signal at a BSM according to the present invention.

First, the process for transmitting an audit request signal at the BSM is described in detail, with reference to FIG. 4.

FIG. 4 shows the process for transmitting an audit request signal at a BSM according to the present invention.

As shown in FIG. 4, the process further comprises the steps of registering a timer (ST11), selecting a subsystem (ST12), determining whether any subsystem is to be selected (ST13), terminating the step of transmitting an audit request signal if no subsystem is selected and selecting alarm codes for each target board of the subsystem if a subsystem is selected (ST14), determining whether any alarm code is to be selected (ST15), transmitting the alarm audit request signal to the corresponding subsystem and then returning to the step of selecting a subsystem (ST16), reading the corresponding alarm code from an alarm database of the BSM if an alarm code is selected (ST17), and setting the alarm as a predetermined bit map (ST18).

That is, the difference between a conventional system and the present invention in transmitting an audit request signal is that the alarm audit signal includes a bit map indicating the alarm information maintained by the BSM.

Each bit of the bit map comprises one-bit Off/On (0/1) information for an alarm unique to each target board.

Figure 5:
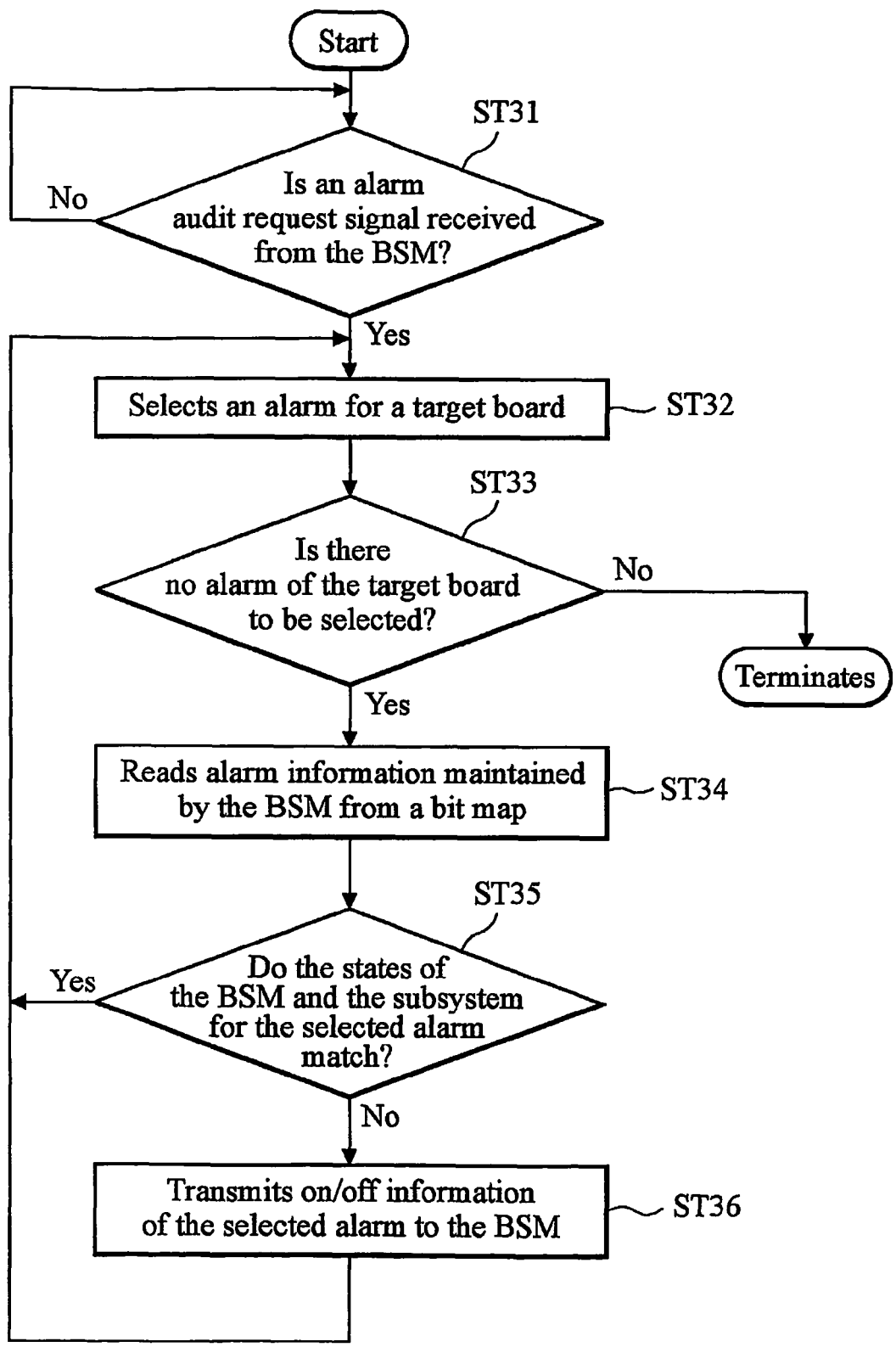
FIG. 5 shows the process for transmitting an alarm report signal at a subsystem according to the present invention.

Next, the process for transmitting an alarm report signal at the subsystem is described in detail, with reference to FIG. 5.

FIG. 5 shows the process for transmitting an alarm report signal at a subsystem according to the present invention.

As shown in FIG. 5, the process further comprises the steps of checking whether the alarm audit request signal is received from the BSM (ST31), keeping checking if the audit request signal has been received and selecting an alarm for a target board if the audit request signal has been received (ST32), determining whether any alarm of the target board is to be selected (ST33), terminating the step of transmitting an alarm report signal if an alarm is selected and reading alarm information maintained by the BSM from a bit map if no alarm is selected (ST34), comparing states of the BSM and the subsystem for the selected alarm (ST35), returning to the step of selecting an alarm if both states are coincident; and transmitting on/off information of the selected alarm to the BSM if both states do not match (ST36).

That is, the difference between a conventional system and the present invention in transmitting an alarm report signal is that the subsystem compares the alarm information in the received bit map with its own alarms, and transmits only the alarms that do not match to the BSM.

The alarms that do not match can be adjusted on the basis of the alarms maintained by the subsystem, because the alarms maintained by the subsystem are more exact and more real-time than the alarm information maintained by the BSM.

INDUSTRIAL APPLICABILITY

According to the present invention, alarms can be kept coincident between the BSM and target boards maintained by the subsystem. Therefore the operator can ascertain the real state of the present system with only a BSM, and take prompt action. As a result, the method contributes to improvement in call quality.

Although the present invention was described with respect to a particular embodiment of the apparatus of selecting CDMA reverse signal, it will be apparent to those skilled in the art that many changes and modifications may be made without departing from the scope of the invention as defined in the appended claims and those equivalent thereto.

The invention claimed is:

1. A method of auditing alarms in a CDMA-2000 1x system, comprising:
   periodically receiving an audit request signal at a subsystem from a base station manager (BSM), wherein the BSM manages target boards of the subsystem and the audit request signal includes a predetermined bit map indicating alarm information on the target boards of the subsystem that are managed by the BSM;
   comparing, at the subsystem, an alarm for each target board managed by the subsystem with the received alarm information; and
   transmitting an alarm report signal to the BSM from the subsystem, wherein the alarm report signal includes information on non-coincident alarms.

2. The method of claim 1, wherein the audit request signal comprises an alarm code for each target board of the subsystem, and wherein the alarm codes are obtained from an alarm database.

3. The method of claim 1, wherein the predetermined bit map comprises one bit on/off information for an alarm unique to each target board of the subsystem.

4. The method of claim 1, wherein transmitting the alarm report signal comprises:
   checking whether the audit request signal has been received from the BSM;
   determining whether any alarm of a given target board is to be selected;
   responsive to determining a first alarm for the given target board is selected, terminating the transmitting of the alarm report signal;
   responsive to determining that no alarms for the given target board are selected, reading alarm information maintained by the BSM from the predetermined bit map;
   comparing states of the BSM and the subsystem for the first alarm;
   selecting an alarm if both states are coincident; and
   transmitting on/off information of the selected alarm to the BSM.

5. The method of claim 1, further comprising reporting to an operator the non-coincident alarms.

6. A method of auditing alarms in a CDMA-2000 1x system, comprising:
   periodically transmitting an audit request signal to a first subsystem from a base station manager (BSM), wherein the BSM manages target boards of the first subsystem and the audit request signal includes a predetermined bit map indicating alarm information on the target boards of the first subsystem that are managed by the BSM; and
   receiving an alarm report signal from the first subsystem at the BSM, wherein the alarm report signal includes information on non-coincident alarms.

7. The method of claim 6, further comprising:
   determining that there is no subsystem to be selected; and
   terminating the transmitting of the audit request signal.

8. The method of claim 6, further comprising:
   determining that the first subsystem is selected; and
   selecting an alarm code for each target board of the first subsystem.

9. The method of claim 6, further comprising selecting the first subsystem after registering a timer.

10. The method of claim 6, further comprising:
    determining that an alarm code is selected; and
    responsive to determining a corresponding alarm code is selected, reading the corresponding alarm code from an alarm database of the BSM.

11. The method of claim 10, further comprising:
    responsive to determining that no alarm code is selected, transmitting the alarm audit request signal to the first subsystem; and
    selecting a second subsystem.

12. The method of claim 6, further comprising setting an alarm as the predetermined bit map.

13. The method of claim 6, wherein the predetermined bit map comprises one bit on/off information for an alarm unique to each target board of the first subsystem.

14. A method of auditing alarms in a CDMA-2000 1x system, comprising:
    receiving an audit request signal at a subsystem from a base station manager (BSM), wherein the BSM manages target boards of the subsystem and the audit request signal includes a predetermined bit map indicating alarm information on the target boards of the subsystem that are managed by the BSM;
    comparing, at the subsystem, an alarm for each target board managed by the subsystem with the received alarm information; and
    transmitting an alarm report signal to the BSM from the subsystem, wherein the alarm report signal includes information on non-coincident alarms.

15. The method of claim 14, further comprising:
    checking that the audit request signal has been received from the BSM; and
    selecting a first alarm for a target board.

16. The method of claim 15, further comprising:
    determining that the first alarm of the target board is selected; and
    terminating transmitting the alarm report signal.

17. The method of claim 14, further comprising:
    determining that a first alarm is not selected;
    reading the alarm information maintained by the BSM from the predetermined bit map, wherein the alarm information comprises a state; and
    comparing states from the predetermined bit map and from the subsystem for the first alarm.

18. The method of claim 17, further comprising:
    determining that both states are coincident;
    responsive to determining both states are coincident, selecting a second alarm for a target board; and
    responsive to determining both states are not coincident, transmitting on/off information of the first alarm to the BSM.

19. The method of claim 14, wherein the predetermined bit map comprises one bit on/off information for an alarm unique to each target board of the subsystem.

* * * * *